US00RE44095E

(19) United States
(12) Reissued Patent
Sanchez

(10) Patent Number: US RE44,095 E
(45) Date of Reissued Patent: Mar. 19, 2013

(54) FANTASY SPORTS LIVE

(76) Inventor: Jose A. Sanchez, Orlando, FL (US)

(21) Appl. No.: 12/475,170

(22) Filed: May 29, 2009

Related U.S. Patent Documents

Reissue of:
(64) Patent No.: 7,351,150
Issued: Apr. 1, 2008
Appl. No.: 11/178,042
Filed: Jul. 8, 2005

(51) Int. Cl.
*G06F 19/00* (2006.01)
*A63F 13/00* (2006.01)
*G06F 17/00* (2006.01)

(52) U.S. Cl. ..... 463/42; 463/40; 463/9; 700/91

(58) Field of Classification Search ..... 463/1, 3, 463/4, 16, 17, 29, 40–42; 455/517
See application file for complete search history.

(56) References Cited

U.S. PATENT DOCUMENTS

| | | | | |
|---|---|---|---|---|
| 5,860,862 | A * | 1/1999 | Junkin | 463/40 |
| 6,669,565 | B2 * | 12/2003 | Liegey | 463/42 |
| 2002/0034980 | A1 * | 3/2002 | Lemmons et al. | 463/40 |
| 2002/0107590 | A1 * | 8/2002 | Liegey | 700/91 |
| 2002/0115488 | A1 * | 8/2002 | Berry et al. | 463/42 |
| 2003/0203757 | A1 * | 10/2003 | Chanda et al. | 463/42 |
| 2004/0266530 | A1 * | 12/2004 | Bishop | 463/42 |
| 2004/0266536 | A1 * | 12/2004 | Mattice et al. | 463/43 |
| 2005/0064937 | A1 * | 3/2005 | Ballman | 463/40 |
| 2005/0239549 | A1 * | 10/2005 | Salvatore et al. | 463/42 |

OTHER PUBLICATIONS

Nintendo Sport Games descriptions from Nintendo Games webpage at <http://www.nintendo.com/> 20 pages retrieved Apr. 13, 2007.*
T195-History of Video Games at <http://jimbodales.blogspot.com/>, 5 pages retrieved Apr. 13, 2007.*
ESPN Fantasy Sports webpage at <http://games.espn.go.com/frontage>, 2 pages retrieved Apr. 12, 2007.*

* cited by examiner

*Primary Examiner* — Melba Bumgarner
*Assistant Examiner* — Frank M Leiva
(74) *Attorney, Agent, or Firm* — Husch Blackwell LLP

(57) ABSTRACT

The purpose of this invention is to change and add to the way fantasy sports games are played by creating an online, virtual live interactive video game that uses fantasy sports statistics as its scoring database system and provides live worldwide communication and competition. The method of playing the online live interactive fantasy video game of the invention comprises a obtaining a subscription to play, selecting a platform from which to play the fantasy game, selecting team members to form a fantasy team, interacting with others playing the fantasy game, and controlling each team member's performance and competing against other fantasy teams. The game includes access to a live fantasy sports television channel to watch games and tournaments, live access to a fantasy sports analyst, and virtual reality software so that the player can become physically involved with the game.

97 Claims, 2 Drawing Sheets

AMENDED

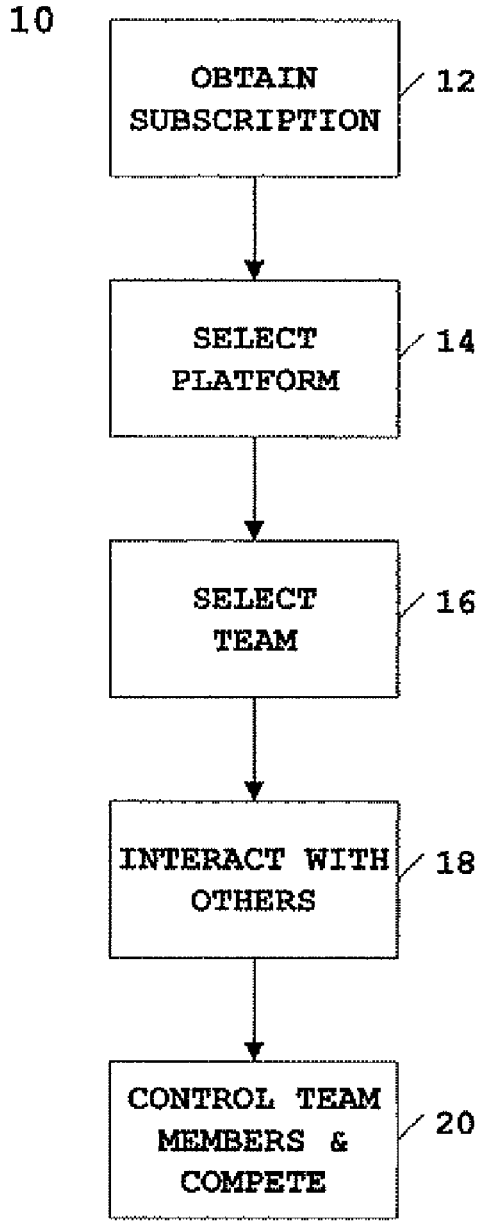
*Figure 1*
AMENDED

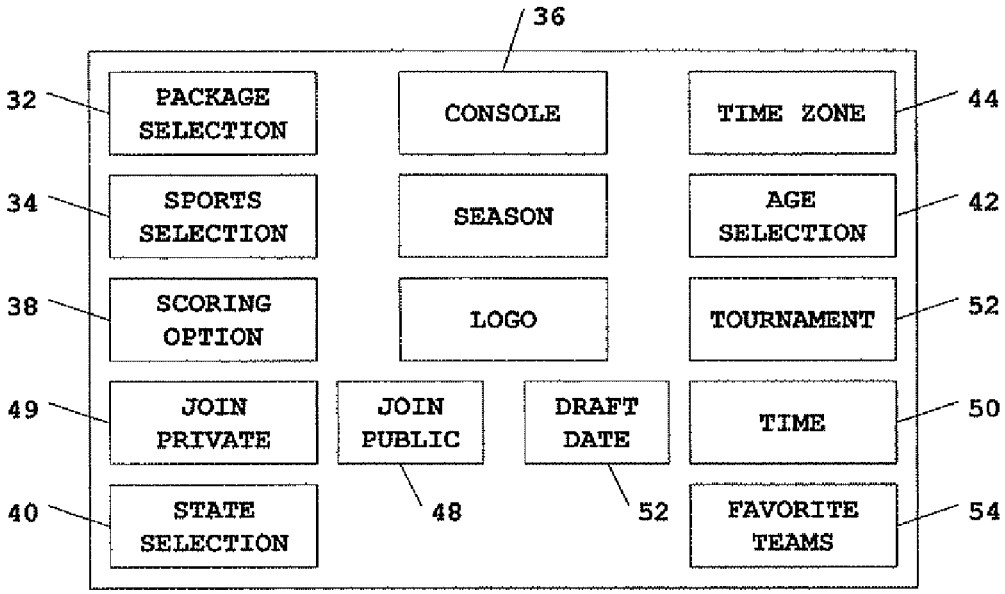
*Figure 2*
AMENDED

FANTASY SPORTS LIVE

Matter enclosed in heavy brackets [ ] appears in the original patent but forms no part of this reissue specification; matter printed in italics indicates the additions made by reissue.

FIELD OF THE INVENTION

The present invention is directed to the field of fantasy video games and more particularly to the field of online live interactive fantasy video games.

BACKGROUND OF THE INVENTION

Fantasy sports have become a way for sports fans from all over the world to interact, communicate, have fun, and compete to achieve on goal, becoming the best manager and player at the game. As well, it creates new friendships, more competition, and new challenges for the opportunity to win cash prizes, awards, and rewards by being the top competitor. Over 30 million people are currently participated in fantasy sports leagues. They play on different sites looking for the best graphic interaction and entertainment. Games currently available are very repetitive, text-based, non-challenging, and expensive with hardly any awards or rewards. Another disadvantage of these currently available games is that the selection of games/sports is somewhat limited. There are currently approximately eight sports that are available that one can join in to play. A third disadvantage of these games is that the fantasy team manager spends several hours in front of a computer or interactive television (please delete this part-only pc) and receives little or no exercise while playing these games.

U.S. Pat. No. 5,860,862 is directed to an interactive fantasy sports game, which allows for real time participation wherein the game participant is able to compete in an interactive game based on an event that is occurring in real time. The participant is able to select and trade members on the participant's team while the event is occurring in real time. This type of game enhances the participant's enjoyment of the game as opposed to those discussed above, however the participant is limited in his involvement in the team's final outcome as the fantasy game is limited to the actual players' performances as the game solely uses data and statistics from the actual players to control their performances. Other than determining which players are to belong on the fantasy team, the participant or fantasy manager of the team has very little input or control on the outcome of the game.

There is a need in the art for a live interactive fantasy game that allows for the fantasy manager of the team to play a more active role in the team's performance. There is also a need in the art for a wider selection of available games and/or sports so that every sport fan is given the opportunity to join in and play their favorite sport. Finally, there is a need in the art for these games to allow for physical participation, such as by virtual reality equipment, by the team managers so that they can increase there physical as well as intellectual fitness.

OBJECTS OF THE INVENTION

It is an object of the invention to change and add to the way fantasy sports games are played by creating an online, virtual live interactive video game that uses fantasy sports statistics as its scoring database system and provides live worldwide communication and competition.

It is another object of the invention to allow one to interact virtually actively and physically within the game.

It is still another object of the invention to create an online virtual live video game that will not only maintain, but will create more fan enthusiasm and challenges.

It is still yet another object of the invention to create an online virtual live video game that will generate more revenue in the industry, create more jobs, and will expand customers worldwide in their interaction with other sport fans and competitive play.

In addition to the various objects and advantages of the invention which have been described in some specific detail above it should be noted that various other objects and advantages of the present invention will become more readily apparent to those persons who are skilled in the relevant art from the following more detailed description, particularly, when such description is taken in conjunction with the attached drawing Figures and with the appended claims.

SUMMARY OF THE INVENTION

The purpose of this invention is to change and add to the way fantasy sports games are played by creating an online, virtual live interactive video game that uses fantasy sports statistics as its scoring database system and provides live worldwide communication and competition. The online live interactive fantasy video game of the invention comprises a means for obtaining a subscription to play the fantasy game, a means for obtaining and/or selecting a platform from which to play the fantasy game, a means for selecting team members to form a fantasy team, a means for interacting with others playing the fantasy game, and a means for controlling each team member's performance and competing against other fantasy teams. The game includes access to a live fantasy sports television channel to watch various games and tournaments. The game also includes live access to a fantasy sports analyst. Another aspect of the invention includes virtual reality software from which the player can connect virtual reality equipment to the game and become physically involved with the game. A method of playing an online live interactive fantasy video game is also disclosed.

BRIEF DESCRIPTION OF THE DRAWINGS

FIG. 1 shows a box diagram depicting the basic steps for playing the online live interactive fantasy video game of the present invention.

FIG. 2 shows an example of a page displaying the different options to be selected by the participant/manager of the fantasy video game of the present invention.

DETAILED DESCRIPTION OF THE INVENTION

The purpose of this invention is to change and add to the way fantasy sports games are played by creating an online, virtual live interactive video game that uses Fantasy Sports statistics as its scoring database system and provides live worldwide communication and competition. This product in general will be created to provide the opportunity to the regular sport fans to experience the reality of fame and success. As well, these games will provide physical fitness activities and a healthier body. These games will be stimulating to the mind and body and will provide a better resource for fitness, health and sports activities. It will maintain you mentally and physically active and productive. This interaction will be broadcast live through the Fantasy Sports TV network, adding live interviews, worldwide tournaments, and live communication. This product will be the top quality entertainment experience for all ages to come.

The video game of the present invention can be called "Fantasy Sports LIVE", "The Reality Series". This will begin the first World and International Series of Fantasy Sports, and will move forward every year. National Fantasy Sports League Association (NFSLA) will regulate these events. Fantasy Sports have become a way for sports fans from all over the world to interact, communicate, have fun, and compete to achieve one goal, becoming the best manager and player at the game. As well, it creates new friendships, more competition, and new challenges for the opportunity to win cash prizes, awards, and rewards from being the top competitor. Over 30 million people are currently participating in fantasy sports leagues. They play on different sites looking for the best graphic interaction and entertainment. Currently, there are only eight sports available that you can join in to play, but by creating an online virtual video game option, over forty plus sports are now available, giving the opportunity to every sport fan to join in and play their favorite sport.

The present invention also allows one to interact virtually actively and physically within the game. By participating in a live, worldwide online video game interaction, based on Fantasy Sports systems and real-life scenarios, it will not only maintain, but will create more fan enthusiasm and challenges. The present invention will also generate more revenue in the industry, create more jobs, and will expand customers worldwide in their interaction with other sport fans and competitive play. It will provide the fan the opportunity to play for your state, country and international championships to determine the best virtual player in the world. It will provide the fan the opportunity to meet people, travel, enjoy, and experience a virtual reality entertainment competition and activity. The present invention provides the sports fans with the best graphical, challenging, exciting, live video stream interaction entertainment ever experience which will revolutionize the 21st century of sports.

Now reference is made to FIG. 1, which shows a box diagram, generally indicated as 10 depicting the basic steps for playing the online live interactive fantasy video game of the present invention. The online live interactive fantasy video game comprises a means for obtaining a subscription to play the fantasy game 12, a means for obtaining and/or selecting a platform from which to play the fantasy game 14, a means for selecting team members to form a fantasy team 16, a means for interacting with others playing the fantasy game 18, and a means for controlling each team member's performance and competing against other fantasy teams 20.

Deluxe sport packages will include:

| Main Events | Regional Events | Other Events |
|---|---|---|
| Baseball | Soccer | Beach Volleyball |
| Basketball | Golf | Water Sports |
| Football | VR-Racing | Kickboxing |
| Hockey | VR-Boxing | Surfing |
| College Football | Tennis | Lacrosse |
| College Basketball | Bowling | VR-Rodeo |
| College Baseball | Wrestling | Arm Wrestling |
| College Hockey | X-Games | VR-Rock Climbing |
| Softball | Great Outdoors | VR-Sailing |
| WNBA | | VR-Skydiving |
| **Racing Events** | **Game Board Events** | **International Events** |
| NASCAR | Fantasy Chess | Rugby |
| Indy 500 | Fantasy Billiards | Polo |

-continued

| | | |
|---|---|---|
| Truck Racing | Fantasy Trivia | Sumo Wrestling |
| Motorcycle Racing | Fantasy Poker | Track and Field |
| Motocross | | Summer Olympics |
| Drag Racing | | Winter Olympics |
| Horse Racing | | Ultimate Challenge |
| Virtual Tour de France | | Cricket |
| Virtual Marathons | | |

There will be a video game for every sport. By integrating and combining the top markets in the industry, the present invention will create the best and unique interactive product line in the entertainment business, based on worldwide tournaments; including sports bar tournaments, college tournaments, restaurants, military, and other future tournaments from diverse companies. We are also adding advanced features, media and communication, virtual interaction and competition plus excellent merchandise and products. Each sport will be played during the regular season, except regional sports, which are played by regional locations. There will be records to break (Record Books), championship histories, live communication, live competition, awards, rewards, prizes and trophies to the best competitors. These accomplishments will be recorded into a virtual Hall of Fame. Tournaments are based on the League, State, Region, and International Championships. Tournaments will be played at the Fantasy Sports Arenas, which will be located by regions. Every event will be broadcast live using the Fantasy Sports Channel TV network. Virtual Racing game events will be played by using virtual motion equipment to simulate the race position. Other VR equipment may apply for each corresponding sport.

International Countries are Based on the Following Options

1. Each country must select the desired sports to compete for International Championships. Counties must qualify to enter for the International Championships.

2. International Tournaments will be played at the Fantasy Olympic Stadiums or Arenas by geography and random selection.

Virtual Reality Games

A new advanced virtual reality wireless console will be developed that will be used for the purpose of playing VR tri-dimensional games. A future option may be provided to rent VR equipment through a company's server, if applicable, or to become a member in our Virtual Reality Centers.

Note** Virtual Reality Centers

Fans who cannot afford the necessary VR equipment can select to play in our VR Centers. Membership Required. All Sports available. Reserve Time and Date for your sports season event. VR Centers will be available worldwide for the fans. Franchise Opportunity for individuals to manage and own. Option to have an Internet Cafe and/or Sport Bar in the location as well to socialize after or before the games.

Players will use body sensor wireless technology equipment to provide virtual real interaction within the game. Future VR game product development will apply per sport.

Examples Are:

Tour de France-Bicycle; VR Boxing-Gloves; VR Marathons-Treadmill; VR Weightlifting-*VR Weights-sensors will increase strength to weights (Exercise option).

Camera Angles

During events, your position in the game or race will be broadcast live and all camera angles will be displayed with 3-D view.

Virtual Sports Trainer

There will be an option for Virtual Sports Trainer Software. The Virtual Sports Trainer will train you to get better at the game, and teach you the ins and outs and also about all the rules and regulations for the sport to be played. The Virtual Trainer will develop your skills both mentally and physically. Practice on all virtual fields will be available per sports.

To play, you must first purchase a CD or an online subscription either of which can be played on a computer via the Internet or interactive television. The CD or subscription is based on the years of your desired membership selection. In the video game server, through a TV network channel or PC, you will select to register for the corresponding season of the sport. The (company) will also offer memberships to play for all or selected sport packages desired as a combination seasonal package. The game includes a demonstration tour explaining how to play the fantasy game and how to register the fantasy team. The owner of the game will need to register and select some options of play by logging into the Fantasy Sports TV-Channel to make those selections.

As illustrated in FIG. 2, you must select the following options.

1. Years purchased or Package Selection (32)
2. Sports selection (34)
3. Console preference (36)
4. Scoring System (38)
5. Geography (40)
6. Age (42)
7. Time Zone (44)
8. Favorite Sports Teams (46)

Under the "years purchased of package selection" option 32, the user selects this option based upon the CD software purchased which is based on the years one would like to play. Under the "sports selection" option 34, the desired sports one would like to play are selected. For the "platform or console preference" option 36 all versions of well-known platforms are available. These platforms or consoles include those such as Xbox, Playstation, Nintendo, Wireless Mobile, PDA, and Personal Computers.

There will be an option for the development of a new advanced virtual quality, wireless console for the purpose of playing the "Virtual Reality" interactive games. New equipment will be manufactured by the company, or third party, to integrate these games into the virtual game packages. Virtual Reality advanced options and products can be sold separately for advanced games. The equipment which may be needed to play these games includes a Console; Web-cam; Videoconference software; Ethernet console card; TV; Microphone; Headphones; Virtual Goggles; Virtual Bicycle; Virtual Treadmill; Racing Gear; Virtual Gloves; Virtual Weights; and any other VR equipment which is applicable per sport.

The scoring system selection 38 is based on two options. The first is "Rotisserie", which is based on your point performance. The mode of play will be as an All Star mode in order to be competitive. The other scoring system is "Head to Head", which is based on a tournament style of play. The video game player will win prizes according to its level of play by ages. There will be a demo tour to visually explain how to play the game and register. A third scoring system will be to "Join a League". There will be two options when joining a head to head league. These are illustrated as reference numerals 48 and 49 in FIG. 2. These options are "Public" 48 where one plays against total strangers. The other is "Private" 49 where the video player invites his/her friends or family to play in a private league. The video game player will need to have a user ID and Password to enter.

The Geography option 40 requires the video game player to select the state or region where he/she resides.

The age option 42 requires the video game player to select the age for the tournament championship he/she will play for. The ages are as follows: Ages 6-9 Little League Championship; Ages 10-15 Junior Championship; Ages 16-21 Senior Championship; and Ages 22 and up Pro Championship.

The Time Zone option 44 requires the video game player to select the time zone for his/her region. The video game player will be given specific hours to play such as Eastern Time; Central Time; Pacific Time; Mountain Time Zone; and International Time Zone.

The Favorite Sports Teams option 46 requires the video game player to select his/her favorite sports team. The video game player will be given the opportunity, if selected as a winner, to meet his/her favorite team/players. The game is played as follows: After logging in and creating an account, the player will enter the Fantasy Sports LIVE TV Channel to register or play. There will be an introductory movie to present the company's product and logo. The following options will be listed, as illustrated in FIG. 2.

1. Package Selection—select your package based on contract years (32)
2. Sports Selection—select the sports you will register and the season (34)
3. Scoring Option—select your tournament scoring system (38)
4. State Selection—select region you reside or will like to play for (40)
5. Time Zone—select your time zone (50)
6. Age Selection—select your age (42)
7. Tournament Selection—select tournament based on age (52)
8. Select Draft date and time (52)
9. Select Favorite Teams—you will have the option to meet and greet with your favorite team players. (54)

To enter a league, the video game player selects a State or Region. Picks a League Name. Picks a League Password and then confirms the League Password.

For the Team Selection, the video game player has the following options: Team Name and the option to Upload the team Logo; Team Uniform; Team Colors; Select Stadium; Enter League Room; and Settings.

Upon entrance to the League Room, the following options are available. The video game player can select to enter a draft room or chat. The video game player can also practice; videoconference with others; enter a live game; or enter league games.

Next, the player will enter a league and select which main events through the FSL (Fantasy Sports League) Sports Center. One can select the live game option, which is the option to select to enter into your scheduled-live broadcast game. One can also select the practice option, which is the option to practice and better your skills in the game. The third selection is the virtual trainer option wherein one can hire a virtual trainer for personal game development.

The game also has the option to chat live which is the option to communicate live using sources such as: Video Conference; Video Phone; Chat Rooms; Fantasy Sports Television (FSTV) Virtual Motion; Fantasy Sports (FS) Bottom Line; E-mail; Forums; FS Radio; All Star voting; and Polls activities.

The game also includes access to the Fantasy Sports Center or The Virtual Studios. Options available through the Virtual Studios include: Draft Analysis; Daily Scores; Daily News; Daily game highlights; Plays of the Day; and Interviews.

Each game player's particular league will have the following: Fantasy News; Standings; Schedules; Rosters; Transactions; Top Leagues; Polls; Trivia; and Interviews.

Drafting will occur in the following manner. To enter the draft, you must login to the Draft Video Conference Room.

Trades are acceptable if approved by the commissioner. Fantasy Sports League (FSL) Commissioner will introduce LIVE Draft with introduction of first pick. The FSL Commissioner will continue to introduce each team selection. If a trade is announced, the FSL Commissioner will introduce the trade. Teams will have 60 seconds to make a selection. Then the draft results are announced. Before the draft, you have the option to select your desired players and move them into your desired preferred bucket or preferred player pool. Fantasy Sports Center will be analyzing and reviewing the draft live.

The game player has the option to select which type of draft to use. Automatic wherein the computer chooses for you if you are unable to assist at the draft. The computer will select your players from the desired bucket under the preferred players list. The other option is Live wherein the game player will assist in the live draft event.

Fantasy Sports LIVE Center will broadcast the following: Draft Analysis; Daily Scores; Daily News; Daily Game Highlights; Plays of the Day; and Fantasy Commercials. Interviews can also be made available to the game subscribers. In these interviews, analysts will call the top team players for league interviews during the season. There will be an option on Fantasy Sports Center to log in and air live for the TV interview.

Fantasy Sports Center will have an analyst that will talk about the best players in order of rankings. After the draft, the analysts will give an opinion as to who should have the best year and their expectations for the season.

If a video game player has selected a package for 3 years or more, then fantasy players will have a salary cap base so that the video game player will be able to manage, trade and use money wisely for free agency.

The Fantasy Sports Live TV Channel will work as follows: Enter Room: Warm up session. The games will be played and viewable live in specific league TV-channel Games of the Week (Top Weekly Leaders) will be broadcast. Also shown will be an All-Star Game—Played at the FSL Arena—Selected Teams will be the top 2 regional players with additional options for multi-player based games. Also available will be Virtual Training software, for both sports and personal development; Tournament of Champions; Commercials; Fantasy Sports News Promotions; Advertisements; Live Halftime Shows; and Merchandise.

Fantasy Sports LIVE News will show: Team News; Injuries; Transactions; Coach of the Week; Player Hot Seat; Player of the week; Top Fantasy Teams; Player News—Who's hot and who's not; League news—Watch League News on FSL TV-Channel.

Tournaments will be organized as follows. For the League Championships, top teams in their division will play with a wildcard position to determine each League Champion. The Tournament will be based on 2 brackets of 4 to decide the League Championship. The top 32 league champions in your region, will enter into a playoff state tournament. Teams will be selected based on point score. The overall league winner inherits the loser's points. The overall winners of each league will compete in a tournament bracket for the State Championship. The tournament games will be aired live on national TV using the Fantasy Sports Network.

State Champions will also be determined. The top 32 League winners will eventually be flown to participate on a "Tournament of Champions" stage for the State Championship from each age and state selected. The state championship winner will represent their region on the World Championship Tournament stage at Las Vegas. State champions will get air and hotel accommodations paid for by the company. The state champion will interview with live analysts. The state champion will also be posted in their state magazine and newspaper. Trophy presentations and awards will be presented after the championship game. The state champion will win the State Championship Ring and trophy.

The state champion then will go into an International Championship to decide the "Virtual International Champion". Media with live interviewers will be part of the stage for all championships.

Tournament games will be aired live under national TV using the FSL TV-Channel Halftime shows will include sponsorship commercials and fantasy top events. Fantasy Sports Networks will broadcast all live events. The National Fantasy Sports Association (NFSA) will regulate and provide the rules to the game.

The overall champion will compete for the International Championship Series.

Regional Championships will be organized as follows: Brackets will be sorted by regions and there will be four brackets of eight and two brackets of four. The regions will be divided by Areas such as: North; West; East; and South, not including Alaska and Hawaii.

State Champions will be positioned in the tournament bracket by highest point score. Each Region will host a tournament based on random selection of stadiums. The Final Four Regional Teams Stage Championship will be staged at Las Vegas for the World Championship Round Series. World Champion of the USA will defend their throne in the International Championship Series.

International Tournaments will be organized as follows: Each country must qualify for the sports to compete for International Championships. International Tournaments will be played at the Fantasy Live Olympic Stadiums/Arenas by geography selection of random choice. Champions will travel to the selected Stadium/Arena to represent their country for the International Championship Stage. Hotel and airfare will be provided by the company. Winners must follow rules applied.

There game will also have the option of sports bar tournaments. There will be tournaments between sports bars by regions. The sports bar league winner will represent their company. Sports bars will face elimination tournaments to decide the State, Regional and International Sports Bar Tournament Champion. Virtual equipment for competitions and rules may apply. Sports Bars will compete for the Virtual Bar Championship (NSBFL). Awards and trophies will be rewarded. There will be a New Federation League (NSPFA); a National Sports Bar Fantasy Association; and International Sports Bar Championships.

Another option of the game includes College Tournaments. There can be established a National College Fantasy League (NCFL). Colleges/Universities will compete for the Virtual College Championship (NCFL). There will be tournaments between colleges for the Virtual College Championship Series. The college league winner will represent their college in the tournament. Once again, awards and trophies will be rewarded.

The game will also set up Fantasy Sports LIVE Stadiums/Arenas. Tournaments will be played at the Fantasy Sports LIVE Stadiums/Arenas. Winners will be flown in to participate in the tournament (airfare and hotel accommodations will be paid for by the company). Arenas will be located at different regions for the tournaments. The Tournament of Champions will have two brackets of 16 and two brackets of eight. Merchandise will be available, as well as, new games with testing rooms. Daily events and live interviews will be held.

A VR Fitness Center will also be available. It will include a Virtual Gym and a VR-Weight lifting Fitness Center. The weights will carry sensors that will be used to increase the weight of the equipment. VR Data gloves will also be part of the equipment to be used for the sensor movements of your body. These sensors will send digitized signals wireless. Also provided will be a Virtual Personal Assistant—to assist you with the workout. Visualize an immersive VR system which increases the pleasure, or decreases the boredom of using these devices by immersing the user in a realistic alternative environment. Such systems indirectly track body movements by monitoring the moving parts on the machine. Choose an array of exercise machines to use such as exercise bike, treadmill, cross country ski simulator, stair climbing simulator, and rowing machine. As part of the Fitness program, P.T. (Personal Trainer) will offer nutritional advice with recipes, preparation instructions and shopping lists to make eating right an easy part of any lifestyle.

Overall, the Personal Trainer will Provide You with
Unlimited Access to the Virtual Personal Trainer
Meal Planning and Nutritional Guidance
Dynamic Workouts to keep you motivated Live Interviews will also be held. These interviews will include: Player of the Week; Coach of the Week; Playoffs; Coach Firing News; FSL Analysts; Daily League Analysis; FSL All-Star Game; Game of the Week; Tournament Championships; and Drafts.

Another aspect of the video game, which will be available, is live fan interaction. The video game will have an option to feel and experience live fan interaction. Fans will get loud, noisy and excited starting and during the game. For future VR games, people can log in to view the game to virtually become part of the crowd to cheer. They will also be able to virtually purchase tickets to sit in the Virtual Stadiums or Arenas.

Awards which can be made available include awards such as the FSL Awards; Coach of the Year; Player Awards; Finals MVP; All-Star MVP; Team of the Year; and Championship Ring. Awards, trophies, prizes will be given at the end of the season to the overall winner. There will be interviews during the award ceremony. FSL will be hosting an annual award ceremony to the best competitors by season. Prizes can include tickets to main events for the sport, the opportunity to meet you favorite pro team players, cash prizes, trips, automobiles, and the like. These prizes will be awarded by the video game company.

During the championship games, a variety of events can be made available such as: Fireworks; a Champagne celebration; Locker room interviews; MVP Selection; Trophy presentation; Championship Party; Championship Parade. The options are limitless, however specific rules may apply for age of the game players.

Every year there will be an award ceremony to present the yearly awards to the best competitors. Awards will be given out by performance category. Awards will be voted on by the public.

Publications, which may be made available, include a daily video newspaper showing your team results. This newspaper can also show top headlines of the Champion on all newspapers and/or the Owner's pictures/Logo. A Fantasy Sports LIVE Magazine can also be available. Subscriptions will be sold or awarded to a yearly magazine. The magazine can publish upcoming fantasy sports news and games, best worldwide teams; and upcoming virtual games and products.

The FSL All-Star Game can be organized as follows. Each video game player will vote for the best teams to represent your region in the FSL Arena All-Star Game. Selected players will enter a Fantasy Hall of Fame. Live broadcasting of the game will occur. Selected players voted in will represent their region. Awards and trophies will be presented after the game. Airfare and hotel accommodations will be paid for by the video game company. Rules may apply for each tournament age.

The FSL Hall of Fame will be set up as follows. The best players and teams will be placed yearly in the Hall of Fame Museum. Other items to be recorded in the Hall of Fame include unbreakable records, championship history per sport, Olympic records, All-Star game records, and the option to retire your name after 10 years.

Video and Communication with other managers can be through various options such as FSL-TV Virtual Motion wherein media communication will be available for one to be able to watch highlights, news and scores for the day on your league. FSL Bottomline will also be available which is a lower bar on the screen showing game scores and results. Email, wireless phone, radio and VR Communication will also be available for communication.

There will be options to voice your opinion, vote, and polls to keep the players connected. Chat Room programs and videoconference software for live communication will be available.

Intermission Excitement/Half Time Shows will be an option.

Sports Championships will be held as follows:

Baseball: Fantasy World Series
Basketball: Fantasy Finals
Football: Fantasy Super Bowl
Soccer: Fantasy World Cup, International Cup Series
Hockey: Fantasy Ice Cup
Olympics: Gold, silver and bronze medallists
Boxing: Championships Belts
Tennis: US Fantasy Open, Fantasy Wimbledon, Australian Fantasy Open
Wrestling: Fantasy Mania—Match-ups
Racing: by Regional Tournaments (i.e.) Daytona Fantasy 500
Golf—by Regional Tournaments (i.e.)Augusta Fantasy Open—Bay Hill Fantasy Open The options are limitless.

FSL Olympics can be organized as follows. They can be played at FSL Olympic Stadiums/Arenas. The summer games can be played every 4 years and the winter games can be played every 2 years. The video game company could require the video game player to purchase and/or select the Olympic package separately. Players must qualify for each event. The players with top points in each individual category will represent country for that category.

At game time, the video player will play the game by entering the FSL TV-channel to play the game. If the video game player is unable to show up he/she will forfeit the game. No games will be postponed unless approved by League Commissioner. Games scheduled will be played LIVE. League highlights will be shown after each game, as well as plays of the Game and Player of the Game.

Rosters will be made available for the game player to set up his/her lineup. These rosters will be available until one-hour before game time. The lineups will be introduced before each game. The overall standings for each team and coach will also be available. An un-droppable player's list will be provided which is an option to unable fans to release star players to benefit another team.

League Schedules will be posted for the entire season. FSL Analysts will briefly analyze each game before it starts based on standings and teams. A playoff picture analysis will also be provided.

The stats made available will be the league leader, team leaders, leader per category and the coach of the week.

The standings will be determined as follows:

There will be six divisions with five teams per division for a total of 30 teams per league. This may vary by sport. The divisions are set as: West; East; and Central. The winner of each division will play in a playoffs scenario with a wild card. Rotisserie play will be based on overall point category.

Transactions may occur for a free agents search, trades which are based on voting, history, and announcements. Injured players and a job finder transactions may also occur.

The job finder transaction will provide several functions. For example, if an owner has inactivity for 2 weeks, he/she will be fired. A job search could be performed such as through the newspaper. The firing of coaches will be displayed at FSL TV. No player can manage more than one team in the same league.

Selling one's team is also an option. Buyers must purchase team at the price given. Available teams will be advertised in team newspapers and on FSL Sports Center. Buyers cannot purchase teams from the same league.

Trades will be announced on Fantasy Live Sports Center. Trades need to be approved by league teams of FSL Commissioner if vetoed. Traded players will have to wait one day before he/she can be available to play. Free Agents can start immediately.

There will be live scoring using a Game Cast method that will display your stats as they are being played live (Real Time). Before each game, the commentators will introduce your starting lineup and you will hear and feel the crowd getting involved and interacting with the players. Automatic coaching can be provided to give assistance during the season.

Control of the player is given to the video game player. In head-to-head tournaments, teams will compete against each other and it will be based on stats. For Rotisserie play, the same options are available, but these tournaments are based on points. League leader and the wild card spot will compete in a league tournament to decide the champion. At the end of the season, the playoffs will be based on the overall standings of each team. The game player will have the option to practice to get better at the game with "Virtual Trainer" online membership software programs.

There will be a "settings" button where it will show your information, owner's pictures and logo, contact and team information. After each game, you can replay the game for review or just to study the opposition. Practice/Exercise option and Virtual Trainer options will also be available.

Fantasy Sports are estimated to be currently generating over $600 million in subscription fees and advertisement revenues. Over 30 million people are currently participating in fantasy sports leagues. According to "Fantasy Sports Trade Association", Fantasy Sports is one of the fastest growing markets in the United States, currently valued at $4.5 Billion. The U.S. Sports Industry reaches US $200B annually. Worldwide, this figure may exceed $500B. Price Waterhouse Coopers (PWC) forecasts that global video game software spending will expand from: $21.2 billion in 2002 to $35.8 billion in 2007, growing at a compound annual rate of 11%. See http://www.pwcglobal.com. The predictions for Europe, Middle East, and Asia are that the market will progress from: $4.9 billion in 2002 to $9.3 billion in 2007, a 13.8% average annual growth rate. The US market is projected to rise from: $7.2 billion in 2002 to $12.3 billion by 2007 with growth average of $11.3% annually. Thus, there is shown to be an ever-increasing market for the interactive fantasy video game of the present invention.

The video games industry now caters to a broadening demographic, which partly accounts for its strong performance over the past five-year period. Outlook reports that 60% of all Americans over the age of six now play video games. With a more mature and diverse audience, game makers have an opportunity to provide content that reflects greater sophistication and wider interests. In fact, the industry's customer base, long the bastion of young boys, now comprises both men and woman.

Online gaming, with its remote multiple-player dynamic, has caught on with consumers and continues to gain popularity. Outlook expects that subscriptions will become the dominant distribution model for online games, and that consoles (rather than PCs) will be the dominant platform.

Wireless gaming technology is in its infancy, but is expected to develop into a significant market segment during the next five years as consumers replace current mobile phones with game-capable handsets. In 2002, 7 million wireless subscribers worldwide had game-capable handsets. That number is expected to reach 40 million by 2007. For example, Mobility Technologies is constructing a wireless digital sensor network for traffic and logistics data collection. The network collects key traffic information, including vehicle speeds, counts, and roadway density, transmitting the data over a wireless network to a data center. There, data is warehoused, mined, and aggregated for distribution to customers via Internet, radio and TV broadcasts.

Broadband Internet access is growing steadily, and is accompanied by growth in online gaming. High-speed Internet access is essential for running the sophisticated virtual reality graphics offered by online games, and the two markets are helping to drive one another.

Virtual Reality Technology is shared and objectively presents like the physical world and is unlimited and harmless as a dream. When VR becomes widely available, it will not be seen as a medium used within physical reality, but rather as an additional reality. VR opens up a new continent of ideas and possibilities.

The global video game software industry is poised for continued strong growth. Among reports by industry analysts, Price Waterhouse Coopers' Entertainment and Media Outlook is not alone in predicting that spending on games will grow at double-digit rates during the next five years. Growth will be driven by the introduction of new hardware platforms and by surging usage of wireless and online games. A broadening audience demographic and expanding distribution channels will playa role, as the medium evolves and the industry continues to cultivate an avid global audience.

The main differences between the present invention and the fantasy sport games currently on the market are numerous. By playing a virtual LIVE video game interaction, using Fantasy Sports database scoring systems, you will control the player; have the opportunity to become famous, play LIVE worldwide, have video conferencing communication; participate in interviews and tournaments; New Federation Sports Leagues will be started; enjoy fan experience as a player; have to opportunity to win rewarding prizes.

The main differences between the present invention and online game which is currently available is that the present invention is based on fantasy sports stats; there will be a Fantasy Sports TV-Channel; a Fantasy Sports Arena; World Wide Tournaments; Trophies and Prizes; Fan Recognition; Advanced Features; and a Fantasy Sports League Federation.

The present invention opens the market to new virtual video game tournament interaction and wireless technology with VR sensor equipment. This invention will create more jobs. Create Video Game expansion and recreation. Present both mental and physical challenges. Provides virtual training software to prepare and develop your skills. Has an upper hand on the market vs. all competitors. New top quality console for personal development. Has the potential for enormous revenue in terms of Merchandise and Products. Provides the players with worldwide recognition, the ability to utilize star players before the playoffs. No player scandals or lockouts and utilizes innovative technology.

Active participation in sports leads to a healthier lifestyle. Fantasy Sports LIVE will lead this generation into a new frontier of innovation into the 21st Century. Fantasy Sports Live will succeed every fan's dream, motivation, and expectation.

While a presently preferred embodiment and alternate embodiments of the present invention have been described in detail above, it should be understood that various other adaptations and/or modifications of the invention can be made by those persons who are particularly skilled in the art without departing from either the spirit of the invention or the scope of the appended claims.

I claim:

1. An *apparatus for playing an* online live virtual interactive fantasy video [game(s)] *game* tournament comprising:

(a) means for obtaining a subscription to play said fantasy *video* game *tournament* in an established league;

(b) means for [at least one of obtaining and selecting a platform from which to play] *playing* said fantasy *video* game tournament as an active player according to [said established] *a set* schedule *via a computer, an interactive television, or a video game console*;

(c) means for selecting *fantasy* team members to form a fantasy team *via the computer, the interactive television, or the video game console*;

(d) means for [interacting] *communicating* with [others] *other users* playing said fantasy *video* game *tournament*; and (e) means for controlling each *fantasy* team member's performance and competing against other fantasy teams according to [an established] *said set* schedule *and via the computer, the interactive television, or the video game console*.

2. [A] *An apparatus for playing an online live* virtual *interactive* fantasy video game tournament as recited in claim 1 wherein said means for obtaining a subscription comprises [one of purchasing a CD and online subscription either of which can be purchased on one of a computer] *means for purchasing said fantasy video game tournament or an online subscription to said fantasy video game tournament* via *one of* an internet connection [and] *an* interactive television*, and a wireless device*.

3. [A] *An apparatus for playing an online live* virtual *interactive* fantasy video game tournament as recited in claim 1 wherein said *fantasy video* game *tournament* includes a demonstration [tour] explaining how to play said fantasy [sports] *video game* tournament [game and] *or* how to register said fantasy team.

4. [A] *An apparatus for playing an online live* virtual *interactive* fantasy video game tournament as recited in claim 1 wherein said *fantasy video* game *tournament* includes means for selecting [at least one of] at least one sport [a game] to play.

5. [A] *An apparatus for playing an online live* virtual *interactive* fantasy video game tournament as recited in claim 1 wherein said [platform comprises all available versions of one of Xbox, Playstation, Nintendo, Wireless Mobile, PDA, and Personal Computer] *fantasy video game tournament includes means for playing said fantasy video game tournament on the computer, the interactive television, or the video game console comprising a wireless mobile device, personal digital assistant, or personal computer*.

6. [A] *An apparatus for playing an online live* virtual *interactive* fantasy video game tournament as recited in claim 1 wherein said means for [interacting] *communicating* with [others] *other users* comprises [one of] *means for* video conferencing, chat rooms, [Fantasy Sports Television, Fantasy Sports Bottom Line, E-mail] *television, e-mail*, forums, [Fantasy Sports Radio, and] *radio, or* virtual reality communication equipment.

7. [A] *An apparatus for playing an online live* virtual *interactive* fantasy video game tournament as recited in claim 6 wherein said means for [interacting] *communicating* with [others] *other users* includes [an ability to interact with] *means for communicating with* a fantasy sports analyst.

8. [A] *An apparatus for playing an online live* virtual *interactive* fantasy video game tournament as recited in claim 1 wherein said means for selecting [players] *fantasy team members* comprises *means for performing* a fantasy draft.

9. [A] *An apparatus for playing an online live* virtual *interactive* fantasy video game tournament as recited in claim 1 wherein said *fantasy video* game *tournament* includes [access to a live and virtual] *means for broadcasting on a* fantasy sports television channel.

10. [A] *An apparatus for playing an online live* virtual *interactive* fantasy video game tournament as recited in claim 9 wherein said fantasy sports television channel includes televised fantasy games, fantasy all-star games, fantasy tournament games, fantasy commercials, virtual training information, fantasy news worldwide, promotions, advertisements, fantasy halftime shows, [and] *or* available fantasy merchandise.

11. [A] *An apparatus for playing an online live* virtual *interactive* fantasy video game tournament as recited in claim 1 wherein said *fantasy video* game *tournament* includes [a series of options with packages including] *means for selecting fantasy video game tournament options including* years purchased, sports *or activities* selections, [console preference,] scoring system, geography, age, time zone and favorite sports teams.

12. [A] *An apparatus for playing an online live* virtual *interactive* fantasy video game tournament as recited in claim 1 wherein said *fantasy video* game *tournament* includes *means for playing a* fantasy sports [tournaments between different teams and sports] *tournament*.

13. [A] *An apparatus for playing an online live* virtual *interactive* fantasy video game tournament as recited in claim 1 wherein said *fantasy video* game *tournament* includes *means for providing* at least one of rewards, trophies, and awards[received for one of individual fantasy achievements and fantasy sports tournament winners].

14. [A] *An apparatus for playing an online live* virtual *interactive* fantasy video game tournament as recited in claim 1 wherein said *fantasy video* game *tournament* further includes [at least one] *means for providing a* fantasy sports award ceremony[for individual performance achievements].

15. [A] *An apparatus for playing an online live* virtual *interactive* fantasy video game tournament as recited in claim 1 wherein said *fantasy video* game *tournament* includes a virtual fantasy hall of fame[wherein fantasy sports achievements by teams and players can be recorded].

16. [A] *An apparatus for playing an online live* virtual *interactive* fantasy video game tournament as recited in claim 1 wherein said *fantasy video* game *tournament* includes [at least one] *a* fantasy sports publication[related to fantasy teams' performances].

17. [A] *An apparatus for playing an online live* virtual *interactive* fantasy video game tournament as recited in claim 1 wherein said *fantasy video* game *tournament* includes *means for providing* voting options for fantasy all-star selections.

18. [A] *An apparatus for playing an online live* virtual *interactive* fantasy video game tournament as recited in claim 1 wherein said *fantasy video* game *tournament* includes *means for providing* at least one of fantasy intermission excitement, fantasy sports halftime shows, and virtual live fan interaction[within the game].

19. [A] *An apparatus for playing an online live* virtual *interactive* fantasy video game tournament as recited in claim 1 wherein said *fantasy video* game *tournament* includes *means for removing or replacing* a [capability of firing at least one of] fantasy sports [owners and coaches] *owner or a fantasy coach*.

20. [A] *An apparatus for playing an online live* virtual *interactive* fantasy video game tournament as recited in claim 1 wherein said *fantasy video* game *tournament* includes [an option of] *means for* selling said fantasy sports teams to *said* other [players per policy] *users*.

21. [A] *An apparatus for playing an online live* virtual *interactive* fantasy video game tournament as recited in claim 1 wherein said [virtual] *fantasy video* game *tournament* includes *means for compiling* fantasy sports statistics[as its scoring system database].

22. [A] *An apparatus for playing an online live* virtual *interactive* fantasy video game tournament as recited in claim 1 wherein said *fantasy video* game *tournament* includes at least one of *a* fantasy sports [stadiums] *stadium* and [arenas] *a fantasy arena*.

23. A method of playing an online live virtual interactive fantasy video game [tournament(s)] *tournament on a computer, an interactive television, or a video game console*, said method comprising the steps of:

(a) creating a fantasy league *on the computer, the interactive television, or the video game console, the fantasy league* having a predetermined number of participants;

(b) establishing a *set* schedule of play *on the computer, the interactive television, or the video game console* for said fantasy league established in step (a);

(c) obtaining a subscription to play *in* said fantasy [game] *league* as an active player;

(d) [at least one of obtaining and] selecting [a platform from which to play said fantasy game] *fantasy team members on the computer, the interactive television, or the video game console to form a fantasy team in said fantasy league* subscribed to in step (c);

[(d) selecting fantasy team members to form a fantasy team;]

(e) [interacting] *communicating* with others playing [said] *a* fantasy game [selected] *in said fantasy league created* in step (a); [and]

(f) controlling each fantasy team member's performance *on the computer, the interactive television, or the video game console*; [and]

(g) competing against other fantasy teams*; and*

(*h*) *based on the controlling of each fantasy team member's performance in step (f) and the competing against other fantasy teams in step (g), compiling fantasy sports statistics in a scoring database*.

24. A method of playing [a] *an online live* virtual *interactive* fantasy video game tournament as recited in claim 23 wherein said [method] *step* of obtaining a subscription comprises [one of] purchasing [a CD and online subscription either of which can be purchased from a computer] *said fantasy video game tournament or an online subscription to said fantasy video game tournament* via *one of* an Internet connection[and], *and* interactive television*, and a wireless device*.

25. A method of playing [a] *an online live* virtual *interactive* fantasy video game tournament as recited in claim 23 further including a step of [following a demonstration tour explaining] *demonstrating* how to play said fantasy *video* game *tournament* and how to register said fantasy team.

26. A method of playing [a] *an online live* virtual *interactive* fantasy video game tournament as recited in claim 23 further including a step of selecting at least one of a sport [and a game to play from a list of several sports and games] *or an activity to play from a list of sports or activities*.

27. A method of playing [a] *an online live* virtual *interactive* fantasy video game tournament as recited in claim 23 [wherein said] *further including a* step of at least one of obtaining and selecting a platform[includes selecting from all available versions of one of Xbox, Playstation, Nintendo, Wireless Mobile, PDA, and Personal Computer]*, wherein said platform comprises a video game console, wireless mobile device, personal digital assistant, or personal computer*.

28. A method of playing [a] *an online live* virtual *interactive* fantasy video game tournament as recited in claim 23 wherein said step of [interacting] *communicating* with others includes [the use of one of] *communicating via* video conferencing, chat rooms, [Fantasy Sports Television, Fantasy Sports Bottom Line, E-mail] *television, e-mail*, forums, [Fantasy Sports Radio, and] *radio, or* virtual reality communication equipment.

29. A method of playing [a] *an online live* virtual *interactive* fantasy video game tournament as recited in claim 28 wherein said step of [interacting] *communicating* with others includes [an ability to interact] *communicating* with a fantasy sports analyst.

30. A method of playing [a] *an online live* virtual *interactive* fantasy video game *tournament* as recited in claim 23 wherein said step of selecting [players includes] *fantasy team members includes executing* a fantasy draft.

31. A method of playing [a] *an online live* virtual *interactive* fantasy video game tournament as recited in claim 23 [wherein said game includes access to] *further including a step of broadcasting on* a live fantasy sports television channel.

32. A method of playing [a] *an online live* virtual *interactive* fantasy video game *tournament* as recited in claim 31 wherein said *step of broadcasting on a live* fantasy sports television channel includes *broadcasting* televised fantasy games, fantasy all-star games, *fantasy* tournament games, commercials, virtual training information, fantasy [sports] news, promotions, advertisements, fantasy halftime shows, [and] *or* available fantasy merchandise.

33. A method of playing [a] *an online live* virtual *interactive* fantasy video game tournament as recited in claim 23 [wherein said game includes] *further including a step of* selecting [from a series of options with packages] *game options* including years purchased, sports *or activities* selections, console preference, scoring system, geography, age, time zone and favorite [sports] teams.

34. A method of playing [a] *an online live* virtual *interactive* fantasy video game tournament as recited in claim 23 [wherein said method includes] *further including a step of* playing *a* fantasy sports [tournaments between different teams] *tournament*.

35. A method of playing [a] *an online live* virtual *interactive* fantasy video game tournament as recited in claim 23

[wherein said method includes] *further including a step of* distributing at least one of rewards, trophies, and awards[for at least one of individual fantasy achievements and fantasy tournament winners].

36. A method of playing [a] *an online live* virtual *interactive* fantasy video game tournament as recited in claim 23 [wherein said method further includes] *further including a step of* holding [at least one] *a* fantasy award ceremony[for individual performance achievements].

37. A method of playing [a] *an online live* virtual *interactive* fantasy video game tournament as recited in claim 23 [wherein said method includes setting up] *further including a step of providing* a virtual fantasy hall of fame[wherein fantasy achievements by teams and players can be recorded].

38. A method of playing [a] *an online live* virtual *interactive* fantasy video game tournament as recited in claim 23 [wherein said method includes providing at least one] *further including a step of providing a fantasy sports* publication[related to a fantasy teams' performances].

39. A method of playing [a] *an online live* virtual *interactive* fantasy video game tournament as recited in claim 23 [wherein said method includes] *further including a step of* providing voting options for fantasy all-star selections.

40. A method of playing [a] *an online live* virtual *interactive* fantasy video game *tournament* as recited in claim 23 [wherein said method includes] *further including a step of providing* at least one of [providing] fantasy sports intermission excitement, fantasy [sports] halftime shows and virtual live fan interaction[within the game].

41. A method of playing [a] *an online live* virtual *interactive* fantasy video game tournament as recited in claim 23 [wherein said method includes providing a capability of firing] *further including a step of removing or replacing* at least one of *a* fantasy sports [owners] *owner* and [coaches] *a fantasy coach*.

42. A method of playing [a] *an online live* virtual *interactive* fantasy video game tournament as recited in claim 23 [wherein said method includes providing an option of] *further including a step of* selling said fantasy [sports team(s)] *team* to [other players] *said others*.

43. A method of playing [a] *an online live* virtual *interactive* fantasy video game tournament as recited in claim 23 [wherein said method further includes] *further including a step of* compiling fantasy sports statistics[as its scoring system database].

44. A method of playing [a] *an online live* virtual *interactive* fantasy video game tournament as recited in claim 23 [wherein said method further includes] *further including a step of* selecting at least one of *a* fantasy sports [stadiums] *stadium* and [arenas] *a fantasy arena*.

[45. In combination with a fantasy sports system the improvement comprising a method of integrating a video gaming, wireless communication, and broadcasting to a system to enable a virtual federation league of tournaments.]

*46. An apparatus for playing an online live virtual interactive fantasy video game tournament as recited in claim 21, wherein said fantasy sports statistics are used for displaying said fantasy team members' performances including while a user is playing said fantasy video game tournament.*

*47. An apparatus for playing an online live virtual interactive fantasy video game tournament as recited in claim 21, wherein said fantasy sports statistics are used for a scoring system.*

*48. An apparatus for playing an online live virtual interactive fantasy video game tournament as recited in claim 21, wherein said fantasy sports statistics are initialized using data and statistics from real-life scenarios.*

*49. A method of playing an online live virtual interactive fantasy video game tournament as recited in claim 43, further including a step of using said fantasy sports statistics to display said fantasy team members' performances including while a user is playing said fantasy video game tournament.*

*50. A method of playing an online live virtual interactive fantasy video game tournament as recited in claim 43, further including a step of using said fantasy sports statistics for a scoring system.*

*51. A method of playing an online live virtual interactive fantasy video game tournament as recited in claim 43, further including a step of using data and statistics from real-life scenarios to initialize said fantasy sports statistics.*

*52. A method for implementing a virtual interactive fantasy video game tournament based on fantasy sports statistics in an established league and according to a set schedule, said method comprising:*

*(a) providing an online environment accessible by one or more users via a computer, interactive television, or a video game console;*

*(b) associating with said one or more users one or more digital representations of fantasy team members from a fantasy sports league, each digital representation having one or more attributes;*

*(c) the computer, the interactive television, or the video game console receiving input from said one or more users to manipulate said one or more digital representations for playing in the established league and according to the set schedule as an active player; and*

*(d) compiling said one or more attributes of said one or more digital representations on the computer, the interactive television, or the video game console.*

*53. A method for implementing a virtual interactive fantasy video game tournament in an established league and according to a set schedule as recited in claim 52, further comprising the additional step of providing an interface to each of said one or more users of said online environment.*

*54. A method for implementing a virtual interactive fantasy video game tournament in an established league and according to a set schedule as recited in claim 52, further comprising the additional step of registering each of said one or more users in connection with said online environment.*

*55. A method for implementing a virtual interactive fantasy video game tournament in an established league and according to a set schedule as recited in claim 52, further comprising the additional step of implementing a scoring system.*

*56. A method for implementing a virtual interactive fantasy video game tournament in an established league and according to a set schedule as recited in claim 55, wherein said step of compiling said one or more attributes includes compiling said one or more attributes using said scoring system.*

*57. A method for implementing a virtual interactive fantasy video game tournament in an established league and according to a set schedule as recited in claim 55, further comprising basing said scoring system on fantasy sports statistics.*

*58. A method for implementing a virtual interactive fantasy video game tournament in an established league and according to a set schedule as recited in claim 55, further comprising basing said scoring system on said one or more users' manipulation of said one or more digital representations.*

*59. A method for implementing a virtual interactive fantasy video game tournament in an established league and according to a set schedule as recited in claim 55, further comprising basing said scoring system on fantasy sports statistics.*

*60. A method for implementing a virtual interactive fantasy video game tournament in an established league and according to a set schedule as recited in claim 52, further comprising*

*basing said one or more attributes on fantasy sports statistics and storing said one or more attributes in a database.*

*61. A method for implementing a virtual interactive fantasy video game tournament in an established league and according to a set schedule as recited in claim 52, further comprising the additional step of competing against another of said one or more users of said fantasy video game tournament.*

*62. A method for implementing a virtual interactive fantasy video game tournament in an established league and according to a set schedule as recited in claim 52, further comprising the additional step of providing software to be executed on the computer, the interactive television, or a wireless device by said one or more users of the computer, the interactive television, or the video game console.*

*63. A method for implementing a virtual interactive fantasy video game tournament in an established league and according to a set schedule as recited in claim 62, further comprising the computer, the interactive television, or the video game console including any available version of a wireless mobile device, personal digital assistant, or personal computer.*

*64. A method for implementing a virtual interactive fantasy video game tournament in an established league and according to a set schedule as recited in claim 52, further comprising the additional step of displaying a fantasy game environment.*

*65. A method for implementing a virtual interactive fantasy video game tournament in an established league and according to a set schedule as recited in claim 64, wherein said step of receiving input from said one or more users to manipulate said one or more digital representations includes receiving input to manipulate said one or more digital representations in said fantasy game environment.*

*66. A method for implementing a virtual interactive fantasy video game tournament in an established league and according to a set schedule as recited in claim 52, further comprising the additional step of implementing a fantasy league system whereby said one or more users may join a fantasy league.*

*67. A method for implementing a virtual interactive fantasy video game tournament in an established league and according to a set schedule as recited in claim 66, further comprising the additional step of hosting a fantasy sports tournament.*

*68. A method for implementing a virtual interactive fantasy video game tournament in an established league and according to a set schedule as recited in claim 52, further comprising the additional step of engaging a fantasy sports tournament.*

*69. A method for implementing a virtual interactive fantasy video game tournament in an established league and according to a set schedule as recited in claim 52, further comprising basing said attributes on fantasy sports statistics regarding said one or more digital representations.*

*70. A method for implementing a virtual interactive fantasy video game tournament in an established league and according to a set schedule as recited in claim 52, wherein said step of compiling said one or more attributes comprises utilizing information generated from manipulating said one or more digital representations.*

*71. A method for implementing a virtual interactive fantasy video game tournament in an established league and according to a set schedule as recited in claim 52, further comprising basing said one or more attributes on said one or more users manipulating said one or more digital representations.*

*72. A method for implementing a virtual interactive fantasy video game tournament in an established league and according to a set schedule as recited in claim 52, wherein said step of compiling said one or more attributes comprises modifying statistical information regarding said one or more digital representations.*

*73. A method for implementing a virtual interactive fantasy video game tournament in an established league and according to a set schedule as recited in claim 52, further comprising the additional step of implementing a scoring system based on said one or more users manipulating of said one or more digital representations.*

*74. A method for implementing a virtual interactive fantasy video game tournament in an established league and according to a set schedule as recited in claim 73, further comprising basing said scoring system on fantasy sports statistics.*

*75. A method for implementing a virtual interactive fantasy video game tournament in an established league and according to a set schedule as recited in claim 52, further comprising compiling said fantasy sports statistics in a database.*

*76. A method for implementing a virtual interactive fantasy video game tournament in an established league and according to a set schedule as recited in claim 52, further comprising the additional step of providing one or more fantasy training scenarios.*

*77. A method for implementing a virtual interactive fantasy video game tournament in an established league and according to a set schedule as recited in claim 76, wherein said providing one or more training scenarios includes demonstrating how to interact with or play with said fantasy video game tournament.*

*78. A method for implementing a virtual interactive fantasy video game tournament in an established league and according to a set schedule as recited in claim 76, wherein said providing one or more training scenarios includes providing a practice scenario to improve said one or more users' abilities.*

*79. A method for implementing a virtual interactive fantasy video game tournament in an established league and according to a set schedule as recited in claim 76, wherein said providing one or more training scenarios includes providing a practice scenario to modify said one or more attributes of said one or more digital representations.*

*80. A method for implementing a virtual interactive fantasy video game tournament in an established league and according to a set schedule as recited in claim 52, further comprising the additional step of displaying fantasy sports statistics in real time.*

*81. A method for implementing a virtual interactive fantasy video game tournament in an established league and according to a set schedule as recited in claim 52, wherein said step of associating with said one or more users one or more digital representations includes executing a fantasy draft.*

*82. A method for implementing a virtual interactive fantasy video game tournament in an established league and according to a set schedule as recited in claim 81, further comprising selecting said one or more digital representations by a computer in said fantasy draft.*

*83. A method for implementing a virtual interactive fantasy video game tournament in an established league and according to a set schedule as recited in claim 81, further comprising selecting said one or more digital representations by said one or more users in said fantasy draft.*

*84. A method for implementing a virtual interactive fantasy video game tournament in an established league and according to a set schedule as recited in claim 52, wherein said step of associating with said one or more users one or more digital representations includes said one or more users selecting said one or more digital representations.*

*85. A method for implementing a virtual interactive fantasy video game tournament in an established league and according to a set schedule as recited in claim 52, further comprising the additional step of associating with each of said one or*

*more users a digital team comprised of said one or more digital representations of said fantasy team members.*

*86. A method for implementing a virtual interactive fantasy video game tournament in an established league and according to a set schedule as recited in claim 85, further comprising the additional step of modifying one or more of the following attributes of said digital team: fantasy team name, fantasy logo, fantasy team uniform, fantasy team colors, or fantasy stadium.*

*87. A method for implementing a virtual interactive fantasy video game tournament in an established league and according to a set schedule as recited in claim 52, further comprising the additional step of competing against another of said one or more users of said fantasy video game tournament.*

*88. A method for implementing a virtual interactive fantasy video game tournament in an established league and according to a set schedule as recited in claim 87, further comprising the additional step of competing against other digital teams.*

*89. A method for implementing a virtual interactive fantasy video game tournament in an established league and according to a set schedule as recited in claim 87, further comprising the additional step of competing against other fantasy teams.*

*90. An online virtual interactive fantasy video game tournament system comprising:*

*(a) a database of statistical information stored on a non-transitory computer readable medium, the statistical information regarding fantasy team members in fantasy sports league;*

*(b) an online environment for live virtual interactive fantasy video game tournaments in an established league and according to a set schedule; and*

*(c) a software component, said software component to be executed via a computer, an interactive television, or a video game console for accepting user input to control, as an active player, fantasy team members' performances in the online environment and for updating the statistical information in the database based on the fantasy team members' performances.*

*91. An online virtual interactive fantasy video game tournament system as recited in claim 90, further comprising input devices to send signals to the computer, the interactive television, or the video game console.*

*92. An online virtual interactive fantasy video game tournament system as recited in claim 90, wherein said software component causes the computer, the interactive television, or the video game console to interact with said online environment.*

*93. An online virtual interactive fantasy video game tournament system as recited in claim 90, wherein said software component implements a fantasy game environment.*

*94. An online virtual interactive fantasy video game tournament system as recited in claim 90, wherein said database is accessible via the Internet.*

*95. An online virtual interactive fantasy video game tournament system as recited in claim 90, wherein said database includes a scoring database.*

*96. An online virtual interactive fantasy video game tournament system as recited in claim 90, further comprising communication equipment.*

*97. An online virtual interactive fantasy video game tournament system as recited in claim 96, wherein said communication equipment comprises two or more components selected from the group consisting of: microphone, headphones, web-cam, videoconference software, and television.*

*98. A method for a user to play a virtual interactive fantasy video game tournament on a computer, an interactive television comprising, or a video game console comprising:*

*selecting on the computer, the interactive television, or the video game console one or more actual sports players to be represented as fantasy sports players of a fantasy league in a virtual interactive fantasy video game tournament;*

*displaying on the computer, the interactive television, or the video game console representations of the selected actual sports players;*

*for at least one of the representations corresponding to at least one of the selected actual sports players, associating characteristics corresponding to historical performance statistics of the at least one of the actual sports players represented by the at least one of the representations;*

*allowing the user to manipulate said at least one of the representations during play of the virtual interactive fantasy video game tournament on the computer, the interactive television, or the video game console for playing as an active player in an established league and according to a set schedule; and*

*compiling performance characteristics on the computer, the interactive television, or the video game console for said one or more representations in accordance with the play of the virtual interactive fantasy video game tournament so that in future play of the virtual interactive fantasy video game tournament with the user, performance of said representations during game play is affected by both the performance characteristics and said user manipulation of said one or more representations.*

* * * * *